United States Patent
Ding et al.

(10) Patent No.: US 10,234,973 B2
(45) Date of Patent: Mar. 19, 2019

(54) TOUCH PANEL, DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Lei Wang, Beijing (CN); Wei Liu, Beijing (CN); Changfeng Li, Beijing (CN); Shengji Yang, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/500,342

(22) PCT Filed: Jul. 1, 2016

(86) PCT No.: PCT/CN2016/088119
§ 371 (c)(1),
(2) Date: Jan. 30, 2017

(87) PCT Pub. No.: WO2017/063385
PCT Pub. Date: Apr. 20, 2017

(65) Prior Publication Data
US 2018/0210586 A1    Jul. 26, 2018

(30) Foreign Application Priority Data

Oct. 15, 2015    (CN) .......................... 2015 1 0666885

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC .......... G09G 3/22; G09G 3/3208; G09G 3/30; G09G 3/3225; G09G 3/3233;
(Continued)

(56) References Cited

U.S. PATENT DOCUMENTS 9,678,594 B2 *   6/2017   Wang ......................... G02F 1/13
9,946,414 B2 *   4/2018   Wang ...................... G06F 3/044
(Continued)

FOREIGN PATENT DOCUMENTS

| CN | 104020913 A | 9/2014 |
|----|-------------|--------|
| CN | 104035640 A | 9/2014 |
| CN | 204965399 U | 1/2016 |

OTHER PUBLICATIONS

PCT International Search Report and Written Opinion dated Sep. 27, 2016, Application No. PCT/CN2016/088119, 13 Pages.

*Primary Examiner* — William Lu
(74) *Attorney, Agent, or Firm* — Brooks Kushman P.C.

(57) ABSTRACT

A touch panel, a display device and a driving method thereof are provided. In the touch panel, a transparent conductive layer is arranged on a side of an array substrate away from an opposite substrate. The transparent conductive layer, functioning as a shielding layer, and touch detection electrodes are applied with an identical touch detection signal at a touch stage. A capacitor is formed by the shielding layer and a metal layer below the touch panel, and a change in
(Continued)

distance from the touch panel to the metal layer due to deformation of the touch panel pressed by a finger only affects capacitance between the shielding layer and the metal layer and causes a change in the touch detection signal applied to the shielding layer, while capacitances of the touch detection electrodes are not affected. Therefore, the accuracy of touch sensing is effectively improved.

16 Claims, 2 Drawing Sheets

(51) Int. Cl.
  *G02F 1/1333* (2006.01)
  *G02F 1/1335* (2006.01)
  *G02F 1/1362* (2006.01)
(52) U.S. Cl.
  CPC ........ *G02F 1/136286* (2013.01); *G06F 3/044* (2013.01); *G06F 3/0418* (2013.01); *G02F 2001/133334* (2013.01); *G02F 2201/121* (2013.01); *G06F 2203/04105* (2013.01)
(58) Field of Classification Search
  CPC .. G09G 3/3241; G09G 3/3266; G09G 3/3275; G09G 3/3258; G06F 3/044; H03K 17/962; H03K 17/955; H03K 17/9645; G01D 5/24
  See application file for complete search history.

(56) References Cited

U.S. PATENT DOCUMENTS

| | | | | |
|---|---|---|---|---|
| 2013/0194195 A1* | 8/2013 | Parekh | ........... | G06F 3/0416 345/173 |
| 2013/0265256 A1* | 10/2013 | Nathan | ........... | G06F 3/0414 345/173 |
| 2013/0307817 A1* | 11/2013 | Kim | ........... | G06F 3/0412 345/174 |
| 2014/0111473 A1* | 4/2014 | Yang | ........... | G06F 3/044 345/174 |
| 2014/0327843 A1* | 11/2014 | Liu | ........... | G02F 1/13338 349/12 |
| 2015/0035790 A1* | 2/2015 | Mo | ........... | G06F 3/044 345/174 |
| 2015/0144920 A1* | 5/2015 | Yamazaki | ........... | H01L 27/323 257/40 |
| 2015/0168767 A1* | 6/2015 | Yonemura | ........... | G02F 1/133308 349/58 |
| 2015/0177880 A1* | 6/2015 | Shin | ........... | G06F 3/0412 345/174 |
| 2015/0296062 A1* | 10/2015 | Lee | ........... | G02F 1/133345 455/566 |
| 2015/0331508 A1* | 11/2015 | Nho | ........... | G06F 3/0421 345/173 |
| 2016/0019855 A1* | 1/2016 | Liu | ........... | G09G 3/3648 345/204 |
| 2016/0291746 A1* | 10/2016 | Kim | ........... | G06F 3/0412 |

* cited by examiner

TOUCH PANEL, DISPLAY DEVICE AND DRIVING METHOD THEREOF

CROSS-REFERENCE TO RELATED APPLICATION APPLICATIONS

This application is the U.S. national phase of PCT Application No. PCT/CN2016/088119 filed on Jul. 1, 2016, which claims priority to Chinese Patent Application No. 201510666885.3 filed on Oct. 15, 2015, the disclosures of which are incorporated in their entirety by reference herein.

TECHNICAL FIELD

The present disclosure relates to the field of touch technology, and in particular, to a touch panel, a display device and a driving method thereof.

BACKGROUND

The display technology develops rapidly and touch panels are widely used in daily life. Currently, depending on its structure, touch panels may be classified into add on mode touch panel, on cell touch panel and in cell touch panel. For the add on mode touch panel, the touch panel and a liquid crystal display (LCD) panel are produced separately, and then attached together so as to form an LCD panel having a touch function. However, the add on mode touch panel has such drawbacks as high manufacture cost, low light transmittance and large thickness. For the in cell touch panel, a touch electrode of the touch panel is built in the LCD panel so as to reduce an entire thickness of the panel and remarkably reduce its manufacture cost, so many manufacturers prefer the in cell touch panel.

The existing in cell touch panel detects a finger touching position based on mutual capacitance principle or self capacitance principle. In self-capacitive touch panel, multiple self-capacitive electrodes are arranged at the same layer and insulated from one another. When a human body does not touch the panel, the capacitance of each self-capacitive electrode is a fixed value. When the human body touches the panel, the capacitance of a corresponding self-capacitive electrode is a combination of the fixed value and the capacitance of the human body. Thus, a touch detection chip may determine a touch position by detecting a change of capacitance of each self-capacitive electrode at a touch stage. Since the capacitance of the human body may affect capacitances of all self-capacitive electrodes in the self-capacitive touch panel while the capacitance of the human body can only affect projected capacitance in a mutual-capacitive touch panel, capacitance change due to a touch operation of the human body on a self-capacitive touch panel can be greater than capacitance change due to a touch operation of the human body on a mutual-capacitive touch panel. Hence, the self-capacitive touch panel has enhanced signal-to-noise ratio of touch operation and improved accuracy of touch sensing when compared with the mutual-capacitive touch panel.

However, in practical use, the touch panel is pressed by a finger and deforms; hence, a distance between the self-capacitive electrode and a metal layer below the touch panel, such as a middle frame of a mobile phone, is decreased and capacitance between the self-capacitive electrode and the metal layer is increased accordingly. Such capacitance change is related to a finger pressure and is not a fixed value. As can be seen, such uncertain capacitance change is a noise interference for touch detection and may adversely affect the accuracy of touch sensing.

SUMMARY

(1) Technical Problem to be Solved

In view of the foregoing, a touch panel, a display device and a driving method thereof are provided according to embodiments the present disclosure, so as to alleviate noise interference of the touch panel caused by finger pressing and improve the accuracy of touch sensing.

(2) Technical Solution

In a first aspect, a touch panel is provided according to an embodiment of the present disclosure, which includes: an array substrate and an opposite substrate arranged opposite to each other; touch detection electrodes arranged on a side of the array substrate facing the opposite substrate and/or on a side of the opposite substrate facing the array substrate; a transparent conductive layer arranged on a side of the array substrate away from the opposite substrate, where the transparent conductive layer functions as a shielding layer; and a touch detection chip, used for applying a touch detection signal to the touch detection electrodes and the transparent conductive layer simultaneously and determining a touch position by detecting a change in capacitance of each touch detection electrode, at a touch stage.

In a possible implementation, in the above-described touch panel, the transparent conductive layer includes multiple touch pressure sensing electrodes arranged closely, and capacitors are formed by the multiple touch pressure sensing electrodes and a metal layer below the array substrate;

the metal layer is arranged at a side of the array substrate away from the opposite substrate; and the touch detection chip is further used for determining a value of a pressure at the touch position by detecting a change in capacitance between each touch pressure sensing electrode and the metal layer at the touch stage.

In a possible implementation, the above-described touch panel further includes a black matrix layer arranged on the side of the opposite substrate facing the array substrate or on the side of the array substrate facing the opposite substrate; and orthogonal projections of gaps between adjacent touch pressure sensing electrodes of the transparent conductive layer onto the array substrate are located within an orthogonal projection of a pattern of the black matrix layer onto the array substrate.

In a possible implementation, in the above-described touch panel, an orthogonal projection of each of the multiple touch pressure sensing electrodes onto the array substrate covers an orthogonal projection of at least one of the touch detection electrodes onto the array substrate.

In a possible implementation, in the above-described touch panel, sizes of the orthogonal projections of the respective touch pressure sensing electrodes onto the array substrate gradually increase along a direction from a center region to a peripheral region of the array substrate.

In a possible implementation, in the above-described touch panel, an electrical signal identical to the touch detection signal is applied to gate lines and data lines of the array substrate at the touch stage.

In a possible implementation, in the above-described touch panel, the touch detection electrodes include multiple self-capacitive electrodes arranged at an identical layer and independent of one another.

In a possible implementation, in the above-described touch panel, a common electrode layer on the array substrate is formed by the multiple self-capacitive electrodes.

In a possible implementation, in the above-described touch panel, the touch detection electrodes include multiple mutual-capacitive electrodes arranged at an identical layer and independent of one another.

In a possible implementation, in the above-described touch panel, the touch detection chip and a display driving chip are integrated into one chip.

In a second aspect, a display device is provided according to an embodiment of the present disclosure, which includes the above-described touch panel and a metal layer arranged below the array substrate of the touch panel.

In a possible implementation, in the above-described display device, the metal layer may be a middle frame of a mobile phone, a backlight metal layer on a backside of a backlight module, a metal frame on an outer surface of the backlight module or a metal sheet attached to the backside of the backlight module.

In a third aspect, a driving method for the above-described display device is provided according to an embodiment of the present disclosure, which includes:

applying the touch detection signal to the touch detection electrodes and the transparent conductive layer simultaneously and determining the touch position by detecting the change in capacitance of each touch pressure sensing electrode, at the touch stage of a period for displaying each frame by the touch panel.

In a possible implementation, the driving method for the above-described touch panel further includes: determining a value of a pressure at the touch position by detecting a change in capacitance between each touch pressure sensing electrode of the transparent conductive layer and the metal layer, at the touch stage.

In a possible implementation, the driving method for the above-described touch panel further includes: applying an electrical signal identical to the touch detection signal to gate lines and data lines of the array substrate at the touch stage.

(3) Advantageous Effects

The above-described technical solutions of the present disclosure have advantageous effects as follows.

With the touch panel, the display device and the driving method thereof according to the embodiments of the present disclosure, the transparent conductive layer arranged on a side of the array substrate away from the opposite substrate is added to the structure of the touch panel. The transparent conductive layer, functioning as the shielding layer, and the touch detection electrodes are applied with the same touch detection signal at the touch stage. Thus, a capacitor is formed of the shielding layer and the metal layer below the panel, and a change in distance between the touch panel and the metal layer below the touch panel due to deformation of the touch panel pressed by a finger only affects capacitance between the shielding layer and the metal layer and causes a change in the touch detection signal applied to the shielding layer, while capacitances of the touch detection electrodes are not affected. Therefore, the accuracy of touch sensing may be effectively improved.

BRIEF DESCRIPTION OF THE DRAWINGS

The accompanying drawings to be used in description of embodiments of the present disclosure are described briefly as follows, to clarify the technical solutions according to the embodiments of the present disclosure. It is apparent that the accompanying drawings in the following description are only for some embodiments of the present disclosure. For those skilled in the art, other accompanying drawings may be obtained based on these accompanying drawings without any creative work.

DETAILED DESCRIPTION

Figure 1:
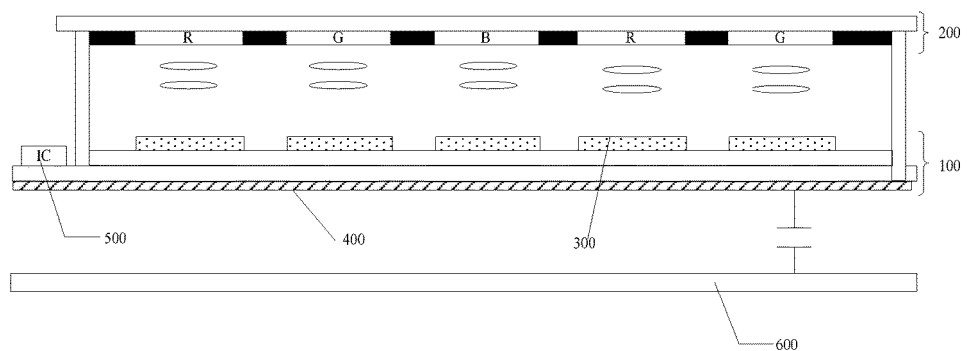
FIG. 1 and FIG. 2 are schematic structural diagrams of touch panels according to embodiments of the present disclosure respectively.

In the following, the present disclosure is detailed in conjunction with the drawings and embodiments. The following embodiments are only used to illustrate the present disclosure, rather than to limit the scope of the present disclosure.

In order to make the objectives, the technical solutions and the advantages of the present disclosure more apparent, the technical solutions of the present disclosure will be described hereinafter in a clear and complete manner in conjunction with the drawings and embodiments. Apparently, the following embodiments are merely a part of, rather than all of, the embodiments of the present disclosure. Based on these embodiments of the present disclosure, a person skilled in the art may obtain other embodiments, which also fall within the scope of the present disclosure.

Unless other definitions are given, technical terms or scientific terms used herein refer to normal meanings which can be understood by the ordinary skilled in the field to which the present disclosure relates. Terms such as "first" and "second" used in the specification and the list of claims of the present disclosure do not indicate any order, numbers or importance, and are merely used to distinguish different components. Similarly, terms such as "a" or "an" represent there exist at least one, rather than to limit the number. Terms such as "connected with" or "connected to" do not limit to physical or mechanical connections, and can include electrical connections which are either direct or indirect. Terms such as "on/above", "under/below", "left" and "right" are merely used to describe a relative position relationship; if the absolute position of one described object alters, the relative position relationship with respect to the described object alters correspondingly.

In order to make the technical problems to be solved, the technical solutions and the advantages of the present disclosure more apparent, the present disclosure is described in detail in conjunction with the drawings and specific embodiments.

A touch panel, a display device and a driving method thereof according to embodiments of the present disclosure are described in detail in conjunction with the drawings.

Thicknesses and shapes of layers in the drawings do not reflect a true scale, which are just for a purpose of illustrating the present disclosure.

A touch panel is provided according to an embodiment of the present disclosure, as shown in FIG. 1, which includes an array substrate 100 and an opposite substrate 200 arranged opposite to each other, and touch detection electrodes 300 arranged on a side of the array substrate 100 facing the opposite substrate 200 and/or on a side of the opposite substrate 200 facing the array substrate 100. The touch detection electrodes 300 are arranged on the array substrate 100 in FIG. 1, which is taken as an example for illustration.

The touch panel further includes: a transparent conductive layer 400, functioning as a shielding layer, arranged on a side of the array substrate 100 away from the opposite substrate 200; and a touch detection chip 500, for applying a touch detection signal to the touch detection electrodes 300 and the transparent conductive layer 400 simultaneously and determining a touch position by detecting a change of capacitance of each touch detection electrode 300 at a touch stage.

With the above-described touch panel according to the embodiment of the present disclosure, the transparent conductive layer 400 arranged on a side of the array substrate 100 away from the opposite substrate 200 is added to the structure of the touch panel. The transparent conductive layer 400, functioning as the shielding layer, and the touch detection electrodes 300 are applied with the same touch detection signal at the touch stage. Thus, as shown in FIG. 1, a capacitor is formed by the shielding layer and a metal layer 600 below the touch panel. A change in distance from the touch panel to the metal layer 600 below the touch panel due to deformation of the touch panel pressed by a finger may only affects capacitance of the capacitor formed by the shielding layer and the metal layer 600, and the touch detection signal applied to the shielding layer may be changed; however, capacitances of the touch detection electrodes 300 may not be affected. Therefore, the accuracy of touch sensing is effectively improved.

Furthermore, in the touch panel according to some embodiments of the present disclosure, since the capacitor is formed by the transparent conductive layer 400 and the metal layer 600 below the transparent conductive layer 400, a pressure sensing function may be achieved by patterning the transparent conductive layer 400.

Figure 2:
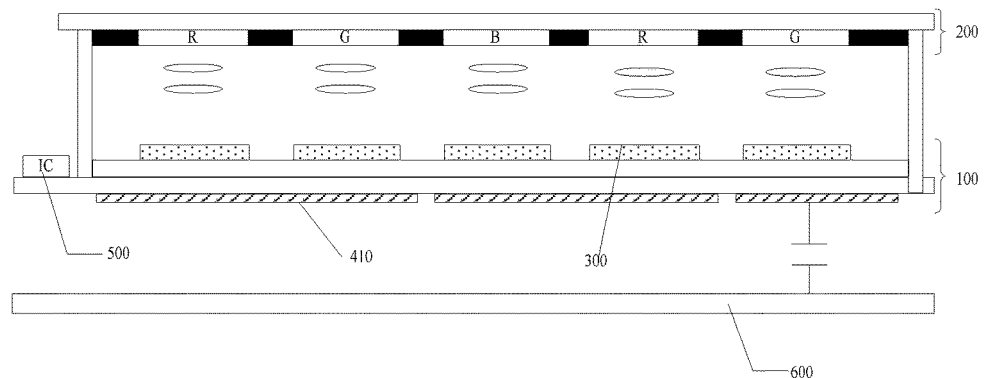

Specifically, in the touch panel according to some embodiments of the present disclosure, as shown in FIG. 2, the transparent conductive layer 400 is divided into multiple touch pressure sensing electrodes 410 that are arranged closely. Each of the touch pressure sensing electrodes 410 and the metal layer 600 below the array substrate 100 form a capacitor. When a position where the touch pressure sensing electrode 410 is located is pressed, a distance between the touch pressure sensing electrode 410 and the metal layer 600 is changed, and accordingly, capacitance between the touch pressure sensing electrode 410 and the metal layer 600 is changed. Thus, the touch detection chip 500 may be used to determine the value of a pressure at the touch position by detecting a change of capacitance between each touch pressure sensing electrode 410 and the metal layer 600 at the touch stage, achieving the pressure sensing function. By integrating the touch pressure sensing electrodes 410 onto the lower surface of the touch panel to achieve the pressure sensing function while touch detection is performed, minor changes are made to the structure of a display device, and such changes to the structure are not limited by assembly tolerance, which is advantageous for achieving better detection accuracy and saving fabrication costs.

In practical, in order not to affect uniformity of light transmission of the touch panel at a display stage, in the touch panel according to some embodiments of the present disclosure, as shown in FIG. 2, an orthogonal projection of a gap between any adjacent touch pressure sensing electrodes 410 of the patterned transparent conductive layer 400 onto the array substrate 100 is located within an orthogonal projection of a pattern of a black matrix layer onto the array substrate 100. The black matrix layer may be arranged on the side of the opposite substrate 200 facing the array substrate 100, or may be arranged on the side of the array substrate 100 facing the opposite substrate 200, which is not specifically limited herein. The black matrix layer is arranged on the side of the opposite substrate 200 facing the array substrate 100, which is taken as an example for illustration in FIG. 2.

Figure 3:
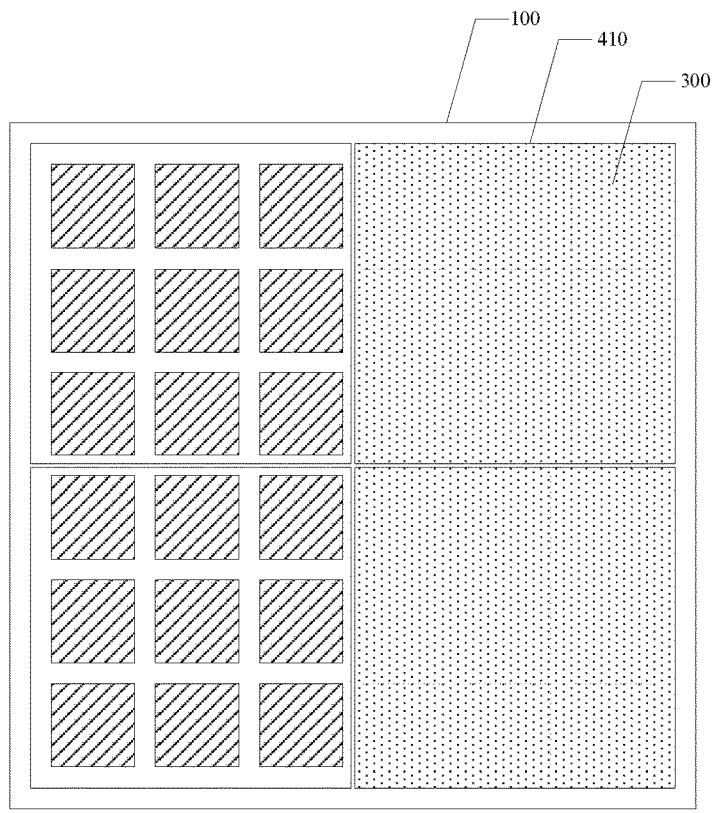
FIG. 3 is a top view of a touch panel according to an embodiment of the present disclosure.

In order to ensure that the patterned transparent conductive layer 400 still has a shielding function, that is, to ensure that the transparent conductive layer 400 may still prevent touch signal detection from being interfered by the metal layer 600 below the touch panel when the touch panel is pressed, as shown in FIG. 2 and FIG. 3, it is generally ensured that an orthogonal projection of the touch pressure sensing electrode 410 onto the array substrate covers an orthogonal projection of at least one touch detection electrode 300 onto the array substrate.

Specifically, in the touch panel according to the embodiments of the present disclosure, the size of each touch pressure sensing electrode 410 may be set depending on required accuracy of touch pressure detection. Since a peripheral region of an in cell touch panel is generally fixed on a fringe frame of the display device, in case of pressing a center region and the peripheral region of the in cell touch panel with the same strength, the touch pressure sensing electrodes 410 in the center region more easily convert pressures into changes in distances between the touch pressure sensing electrodes 410 and the metal layer 600 below the touch pressure sensing electrodes 410, that is, the center region is more sensitive to pressure than the peripheral region. Therefore, in a specific design, in order to make pressure sensing sensitivity of a whole panel relatively uniform, sizes of orthogonal projections of respective touch pressure sensing electrodes 410 onto the array substrate 100 gradually increase along a direction from the center region to the peripheral region of the array substrate 100. Thus, the capacitance associated with the touch pressure sensing electrode 410 arranged in the peripheral region where is not very sensitivity to pressure can be relatively large, and capacitance change there can be more significant.

In practical, there may be various implementations for the touch detection electrodes used for touch detection in the touch panel according to the embodiments of the present disclosure. For example, the touch detection electrodes may be implemented into multiple self-capacitive electrodes arranged at the same layer and independent of one another, or may be implemented into mutual-capacitive electrodes, which is not limited herein.

When the self-capacitive electrodes are used to achieve the touch detection function, a common electrode layer in the array substrate may double as self-capacitive electrodes. In other words, the common electrode layer in the array substrate is formed by multiple self-capacitive electrodes. No process needs to be added to manufacturing process of the existing array substrate, to divide the common electrode layer into self-capacitive electrodes, which may save manufacturing costs and improve the manufacturing efficiency.

Practically, in the in cell touch panel according to the embodiments of the present disclosure, in order to reduce mutual interferences between a display signal and a touch signal, the touch panel needs to be driven in a time-division manner based on a touch stage and a display stage. In addition, a display driving chip and the touch detection chip may be practically integrated into one chip, further reducing manufacturing costs.

Figure 4:
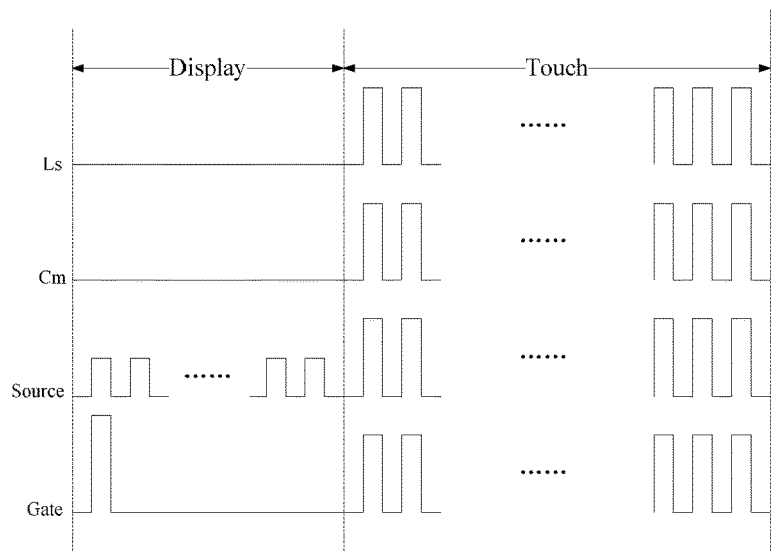
FIG. 4 is a sequential diagram of a driving process of a touch panel according to an embodiment of the present disclosure.

Specifically, for example, in a sequential diagram of a driving process as shown in FIG. 4, a time period for displaying each frame (V-sync) by the touch panel includes a display stage (Display) and a touch stage (Touch). In the display stage (Display), gate scanning signals are sequentially applied to gate lines Gate in the touch panel, and grayscale signals are applied to data lines Source. In the case that the common electrode layer doubles as self-capacitive electrodes, the touch detection chip connected to the respective self-capacitive electrodes Cm applies common electrode signals to the respective self-capacitive electrodes Cm, so as to achieve a liquid crystal display function. In the touch stage (Touch), as shown in FIG. 4, the touch detection chip connected to the self-capacitive electrodes Cm applies the touch detection signal to the self-capacitive electrodes Cm and touch pressure sensing electrodes Ls simultaneously, receives feedback signals from the self-capacitive electrodes Cm and the touch pressure sensing electrodes Ls, and determines whether any touch occurs and determines the value of a pressure by analyzing the feedback signals, so as to achieve both the touch function and the pressure sensing function.

Furthermore, as shown in FIG. 4, in order to avoid the accuracy of pressure sensing from being affected by earth capacitances generated between the gate lines in the array substrate and the touch pressure sensing electrodes and between the data lines in the array substrate and the touch pressure sensing electrodes in the touch stage (Touch), an electrical signal identical to the touch detection signal may be applied to the gate lines and the data lines in the array substrate at the touch stage. In this way, the earth capacitances between the gate lines and the touch pressure sensing electrodes and between the data lines and the touch pressure sensing electrodes may be eliminated, such that the accuracy of pressure sensing can be improved.

It should be noted that, the touch panel according to the embodiments of the present disclosure may be a liquid crystal display (LCD), or an organic electroluminescent display (OLED), or may be other panels, which is not limited herein.

Based on same inventive concept, a display device is provided according to an embodiment of the present disclosure, which includes the above-described touch panel according to the embodiments of the present disclosure and a metal layer arranged below the array substrate of the touch panel. The display device may be any product or component with a display function, such as a mobile phone, a tablet computer, a television, a display, a notebook computer, a digital photo frame, or a navigator. For the implementation of the display device, reference may be made to the embodiments of the above-described touch panel, and the description of the same is not repeated herein.

Specifically, in the case that the above-described display device according to some embodiments of the present disclosure is the mobile phone, the metal layer arranged below the touch panel may be a middle frame of the mobile phone. In the case that the touch panel of the display device according to some embodiments of the present disclosure is a liquid crystal display, the metal layer arranged below the touch panel may be a backlight metal layer on a backside of a backlight module. The backlight metal layer may be a metal frame provided on an outer surface of the backlight module, or may be a metal sheet attached to the backside of the backlight module, which is not limited herein.

Based on same inventive concept, a driving method for the above-described display device is provided according to an embodiment of the present disclosure, which includes:

applying a touch detection signal to the touch detection electrodes and the transparent conductive layer simultaneously and determining the touch position by detecting a change in capacitance of each touch pressure sensing electrode, at a touch stage of a period for displaying each frame.

Furthermore, the driving method further includes: detecting a change in capacitance associated with each touch pressure sensing electrode of the transparent conductive layer to determine the value of a pressure at the touch position, at a touch stage.

Furthermore, the driving method further includes: applying an electrical signal identical to the touch detection signal to gate lines and data lines of the array substrate, at the touch stage.

With the touch panel, the display device and the driving method according to the embodiments of the present disclosure, the transparent conductive layer arranged on a side of the array substrate away from the opposite substrate is added to the structure of the touch panel. The transparent conductive layer, functioning as the shielding layer, and the touch detection electrodes are all applied with the same touch detection signal at the touch stage. Thus, a capacitor is formed by the shielding layer and the metal layer below the touch panel, and a change in distance from the touch panel to the metal layer below the touch panel due to deformation of the touch panel pressed by a finger only affects a capacitance of the capacitor formed by the shielding layer and the metal layer, and the touch detection signal applied to the shielding layer may be changed; however, capacitances of the touch detection electrodes may not be affected. Therefore, the accuracy of touch sensing may be effectively improved.

It is apparent to those skilled in the art that various changes and modifications may be made to the present disclosure without departing from the spirit and scope of the present disclosure. In this way, provided that these changes and modifications of the present disclosure belong to the scope of the claims and equivalent techniques of the present disclosure, the present disclosure also intends to include these changes and modifications.

The invention claimed is:

1. A touch panel, comprising:
    an array substrate and an opposite substrate arranged opposite to each other;
    touch detection electrodes arranged on a side of the array substrate facing the opposite substrate and/or on a side of the opposite substrate facing the array substrate;
    a transparent conductive layer arranged on a side of the array substrate away from the opposite substrate, wherein the transparent conductive layer functions as a shielding layer; and
    a touch detection chip, configured to apply a touch detection signal to the touch detection electrodes and the transparent conductive layer simultaneously and determine a touch position by detecting a change in capacitance of each touch detection electrode, at a touch stage, wherein the transparent conductive layer comprises a plurality of touch pressure sensing electrodes arranged closely, and capacitors are formed by the plurality of touch pressure sensing electrodes and a metal layer below the array substrate; and the touch detection chip is further configured to determine a value of a pressure at the touch position by detecting a change in capacitance between each of the plurality of touch pressure sensing electrodes and the metal layer at the touch stage, wherein the touch panel further comprises a black matrix layer arranged on the side of the opposite substrate facing the array substrate or on the side of the array substrate facing the opposite substrate, orthogonal projections of gaps between adjacent touch pressure sensing electrodes of the transparent conductive layer onto the array substrate are located within an orthogonal projection of a pattern of the black matrix layer onto the array substrate.

2. The touch panel according to claim 1, wherein an orthogonal projection of each of the plurality of touch pressure sensing electrodes onto the array substrate covers an orthogonal projection of at least one of the touch detection electrodes onto the array substrate.

3. The touch panel according to claim 2, wherein sizes of the orthogonal projections of the respective touch pressure sensing electrodes onto the array substrate gradually increase along a direction from a center region to a peripheral region of the array substrate.

4. The touch panel according to claim 1, wherein an electrical signal identical to the touch detection signal is applied to gate lines and data lines of the array substrate at the touch stage.

5. The touch panel according to claim 1, wherein the touch detection electrodes comprise a plurality of self-capacitive electrodes arranged at an identical layer and independent of one another.

6. The touch panel according to claim 5, wherein a common electrode layer on the array substrate is formed by the plurality of self-capacitive electrodes.

7. The touch panel according to claim 1, wherein the touch detection electrodes comprise a plurality of mutual-capacitive electrodes arranged at an identical layer and independent of one another.

8. The touch panel according to claim 1, wherein the touch detection chip and a display driving chip are integrated into one chip.

9. A display device, comprising:
a touch panel; and
a metal layer arranged below an array substrate of the touch panel;
wherein the touch panel comprises:
an opposite substrate arranged opposite to the array substrate;
touch detection electrodes arranged on a side of the array substrate facing the opposite substrate and/or on a side of the opposite substrate facing the array substrate;
a transparent conductive layer arranged on a side of the array substrate away from the opposite substrate, wherein the transparent conductive layer functions as a shielding layer; and
a touch detection chip, configured to apply a touch detection signal to the touch detection electrodes and the transparent conductive layer simultaneously and determine a touch position by detecting a change in capacitance of each touch detection electrode, at a touch stage, wherein the transparent conductive layer comprises a plurality of touch pressure sensing electrodes arranged closely, and capacitors are formed by the plurality of touch pressure sensing electrodes and a metal layer below the array substrate; and the touch detection chip is further configured to determine a value of a pressure at the touch position by detecting a change in capacitance between each of the plurality of touch pressure sensing electrodes and the metal layer at the touch stage, wherein the touch panel further comprises a black matrix layer arranged on the side of the opposite substrate facing the array substrate or on the side of the array substrate facing the opposite substrate, orthogonal projections of gaps between adjacent touch pressure sensing electrodes of the transparent conductive layer onto the array substrate are located within an orthogonal projection of a pattern of the black matrix layer onto the array substrate.

10. The display device according to claim 9, wherein the metal layer is a middle frame of a mobile phone, a backlight metal layer on a backside of a backlight module, a metal frame on an outer surface of the backlight module or a metal sheet attached to the backside of the backlight module.

11. A driving method for a display device the display device comprising:
a touch panel, and a metal layer arranged below an array substrate of the touch panel, the touch panel comprising an opposite substrate arranged opposite to the array substrate, touch detection electrodes arranged on a side of the array substrate facing the opposite substrate and/or on a side of the opposite substrate facing the array substrate, a transparent conductive layer arranged on a side of the array substrate away from the opposite substrate, the transparent conductive layer functioning as a shielding layer, and a touch detection chip, configured to apply a touch detection signal to the touch detection electrodes and the transparent conductive layer simultaneously and determine a touch position by detecting a change in capacitance of each touch detection electrode, at a touch stage;
wherein the driving method comprises:
applying the touch detection signal to the touch detection electrodes and the transparent conductive layer simultaneously and determining the touch position by detecting the change in capacitance of each touch pressure sensing electrode, at the touch stage of a period for displaying each frame by the touch panel,
wherein the transparent conductive layer comprises a plurality of touch pressure sensing electrodes arranged closely, and capacitors are formed by the plurality of touch pressure sensing electrodes and a metal layer below the array substrate; and the touch detection chip is further configured to determine a value of a pressure at the touch position by detecting a change in capacitance between each of the plurality of touch pressure sensing electrodes and the metal layer at the touch stage,
wherein the touch panel further comprises a black matrix layer arranged on the side of the opposite substrate facing the array substrate or on the side of the array substrate facing the opposite substrate, orthogonal projections of gaps between adjacent touch pressure sensing electrodes of the transparent conductive layer onto the array substrate are located within an orthogonal projection of a pattern of the black matrix layer onto the array substrate.

12. The driving method according to claim 11, further comprising: determining a value of a pressure at the touch position by detecting a change in capacitance between each touch pressure sensing electrode of the transparent conductive layer and the metal layer, at the touch stage.

13. The driving method according to claim 12, further comprising: applying an electrical signal identical to the touch detection signal to gate lines and data lines of the array substrate at the touch stage.

14. The touch panel according to claim 1, wherein the touch pressure sensing electrodes are spaced from each other.

15. The display device according to claim 9, wherein the touch pressure sensing electrodes are spaced from each other.

16. The driving method according to claim 11, wherein the touch pressure sensing electrodes are spaced from each other.

\* \* \* \* \*